(12) United States Patent
Miura

(10) Patent No.: US 6,704,347 B1
(45) Date of Patent: Mar. 9, 2004

(54) CDMA RECEIVER OPERABLE IN A TIME DIVISION FASHION AND METHOD FOR CONTROLLING THE SAME

(75) Inventor: Tetsuya Miura, Toyko (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/471,002

(22) Filed: Dec. 23, 1999

(30) Foreign Application Priority Data

Dec. 24, 1998 (JP) .......................................... 10-367878

(51) Int. Cl.[7] ................................................ H04B 1/69
(52) U.S. Cl. ..................................................... 375/150
(58) Field of Search ................................. 375/130, 136, 375/150, 142, 143, 299, 342, 349; 370/320, 335, 342, 441; 455/132, 133, 134

(56) References Cited

U.S. PATENT DOCUMENTS

| 5,684,793 | A | | 11/1997 | Kiema et al. | |
|---|---|---|---|---|---|
| 5,764,688 | A | | 6/1998 | Hulbert et al. | |
| 5,809,062 | A | * | 9/1998 | Hulbert | 375/144 |
| 5,966,411 | A | * | 10/1999 | Struhsaker | 375/332 |
| 6,154,487 | A | * | 11/2000 | Murai et al. | 375/150 |
| 6,188,679 | B1 | * | 2/2001 | Sato | 370/335 |
| 6,229,840 | B1 | * | 5/2001 | Ichihara | 375/147 |
| 6,298,227 | B1 | * | 10/2001 | Molnar | 455/323 |
| 6,333,926 | B1 | * | 12/2001 | Van Heeswyk et al. | 370/335 |
| 6,411,610 | B1 | * | 6/2002 | Li et al. | 370/335 |
| 6,496,534 | B1 | * | 12/2002 | Shimizu et al. | 375/148 |

FOREIGN PATENT DOCUMENTS

| JP | 7-202843 | | 8/1995 |
|---|---|---|---|
| JP | 8-228170 | | 9/1996 |
| JP | 10-308689 | | 11/1998 |
| JP | 10-336072 | | 12/1998 |
| KR | 97-72735 | A | 11/1997 |

* cited by examiner

Primary Examiner—Emmanuel P Bayard
(74) Attorney, Agent, or Firm—Sughrue Mion, PLLC

(57) ABSTRACT

In a CDMA receiver used in a CDMA cellular mobile telephone system, a searcher which is used to determine reception timing of a plurality of finger processing portions is operated in a time division fashion to enable wide searching range without any expansion of a size. Specifically, a plurality of correlators and/or adders are controlled in a time division fashion to decrease the number of the correlators and/or the adders together with registers for storing integrated correlation value signals.

3 Claims, 6 Drawing Sheets

| SLOT #n | SLOT #n+1 | SLOT #n+2 | SLOT #n+3 |
|---|---|---|---|
| OPERATION AT OPERATION TIMING 1 | OPERATION AT OPERATION TIMING 2 | OPERATION AT OPERATION TIMING 3 | OPERATION AT OPERATION TIMING 4 |

FIG. 4

CDMA RECEIVER OPERABLE IN A TIME DIVISION FASHION AND METHOD FOR CONTROLLING THE SAME

BACKGROUND OF THE INVENTION

This invention relates to a code division multiple access (CDMA) receiver for use in a CDMA system and a method of controlling the CDMA receiver.

As a cellular mobile radio communication system, a wide variety of multiple access systems have been heretofore proposed and be adopted in the world. Among others, a recent tendency has been directed to a cellular mobile radio code division multiple access (CDMA) system which has a specific spreading code assigned to each channel and which will be simply called a CDMA system. In such a CDMA system, a modulated wave of an identical carrier frequency which is spread by each specific spreading code is transmitted as a radio signal from a transmitter side to a receiver side. Responsive to the radio signal, a CDMA receiver in the receiver side carries out synchronization operation by the use of each specific spreading code to identify a desired channel. In order to distinguish the channels from one another, different spreading codes are used to identify radio channels between the base station and the mobile terminals.

In addition, it is to be noted that the radio signal is received through a plurality of paths, namely, a multipath in the CDMA system and, therefore, multipath fading should be removed from the radio signal in the CDMA receiver by accurately detecting a predetermined signal, such as a synchronization signal and/or a pilot signal.

Furthermore, it is to be considered in the cellular mobile radio communication system that each mobile terminal is moved through the radio service areas or cells from one to another with communication kept between each mobile terminal and a base station. In this event, the base stations must be switched from one to another without interrupting communication with each mobile terminal.

Taking the above into account, a CDMA receiver which is used in a mobile terminal has a rake receiver supplied with radio signals through the multipath and a searcher for searching such multipath signals to establish chip synchronization. In other words, the searcher is used to detect optimum reception timing from the radio signals and to inform the rake receiver of the optimum reception timing. This applies to the CDMA receiver which is used in each base station. Therefore, the following description will be mainly made about the CDMA receiver of the base station.

Practically, both the rake receiver and the searcher are given reception data signals which are subjected to high frequency amplification and frequency conversion by a high frequency amplifier and an intermediate amplifier, respectively. In this event, the rake receiver is operable in response to the reception data signals received through the multipath and comprises a plurality of finger receivers for demodulating the reception data signals by the use of spreading codes into demodulated signals. To this end, calculations are made about correlations between a spreading code of a desired channel and each received multipath signal to capture codes at each reception timing through each path. Thereafter, maximal-ratio combining is carried out to augment received signal strength. Such maximal-ratio combining is effective to alleviate an influence of the multipath fading and to improve a signal-to-noise (S/N) ratio.

On the other hand, the searcher has a plurality of correlators which are operable in response to the reception data signals and delayed spreading codes to calculate correlation values between the reception data signals and the delayed spreading codes and a plurality of adders for adding the respective correlation values to store summed up correlation values into registers. Moreover, the summed up correlation values are delivered to a reception timing judgment circuit to determine an effective path and to supply the finger circuits of the rake receiver with reception timing signals representative of the effective path or optimum reception timing.

Herein, it is to be noted that the correlators of the searcher are in one-to-one correspondence to the adders.

Recently, recent attempts have been made to widen each of the cells in such a CDMA system to reduce a frequency of handoff operations for switching the base stations from one to another. This results in enlargement of a cell radius of each cell. Such enlargement of the cell radius brings about expanding a searching range in the searcher of the CDMA receiver in each base station. In other words, the searcher must be widened in the searching range.

In order to widen the searching range in the searcher, it is necessary to increase the correlators and the corresponding adders in number. Practically, the searching range is determined by a chip number of the spreading code and must have a predetermined resolution. In consequence, the correlators and the corresponding adders should be increased in number as the searching range is widened because the number of the correlators is equal to a product of the chip number and the resolution as well as the number of the adders.

Under the circumstances, the searcher is inevitably complicated in structure as the searching range is widened, because of a large number of the correlators and the adders. In addition, it is very difficult to make each base station small in size when the correlators and the adders are increased in number.

SUMMARY OF THE INVENTION

It is an object of this invention to provide a receiver which is usable in a CDMA system, which is simple in structure and small in size.

It is another object of this invention to provide a receiver of the type described, which is capable of coping with widening a search range of a searcher without increasing correlators and adders included in the searcher.

It is still another object of this invention to provide a receiver of the type described, which is usable in a base station and which is operable at a high speed.

It is another object of this invention to provide a searcher which is capable of searching optimum reception timing from a wide searching range without an increase of correlators and/or adders.

It is yet another object of this invention to provide a method of searching optimum reception timing from a wide searching range without an increase of correlators and adders.

According to an aspect of this invention, a method is for use in searching optimum reception timing from reception data signals which are received through a plurality of paths by a searcher in a CDMA system to detect optimum reception timing. The method comprises the steps of calculating, in a time division fashion, correlation values between the reception data signals and spreading codes successively delayed, to produce summed up correlation values and determining the optimum reception timing from the summed up correlation values.

In this event, the calculation step may comprise the steps of despreading the reception data signals by using the successively delayed spreading codes to produce the correlation values and summing up each of the correlation values in the time division fashion to obtain the summed up correlation values in the time division fashion. Alternatively, the calculation step may comprise the steps of despreading the reception data signals in the time division fashion by using the successively delayed spreading codes to produce the correlation values in the time division fashion and summing up each of the correlation values to obtain the summed up correlation values in the time division fashion.

According to another aspect of this invention, a method is for use in receiving reception data signals to produce a decoded data signal in a CDMA system and comprises the steps of calculating, in a time division fashion, correlation values between the reception data signals and spreading codes successively delayed, to produce summed up correlation values, determining the optimum reception timing from the summed up correlation values, despreading the reception data signals by using the optimum reception timing to produce despread and detected data signals, carrying out maximal-ratio combining of the despread and detected data signals to produce a combined data signal, and decoding the combined data signal into the decoded data signal.

According to still another aspect of this invention, a searcher is for use in a CDMA receiver to search optimum reception timing from reception data signals which are received through a plurality of paths and comprises calculation means for calculating, in a time division fashion, correlation values between the reception data signals and spreading codes successively delayed, to produce summed up correlation values and decision means for determining the optimum reception timing from the summed up correlation values.

According to another aspect of this invention, a CDMA receiver is for use in a CDMA system to produce a decoded data signal in response to reception data signals and comprises calculation means for calculating, in a time division fashion, correlation values between the reception data signals and spreading codes successively delayed, to produce summed up correlation values, determining means for determining the optimum reception timing from the summed up correlation values, despreading means for despreading the reception data signals by using the optimum reception timing to produce despread and detected data signals, means for carrying out maximal-ratio combining of the despread and detected data signals to produce a combined data signal, and decoding the combined data signal into the decoded data signal.

BRIEF DESCRIPTION OF THE DRAWINGS

FIG. 4 shows a timing chart for use in describing operation timing of the searcher illustrated in FIG. 2;

DESCRIPTION OF THE PREFERRED EMBODIMENTS

Figure 1:
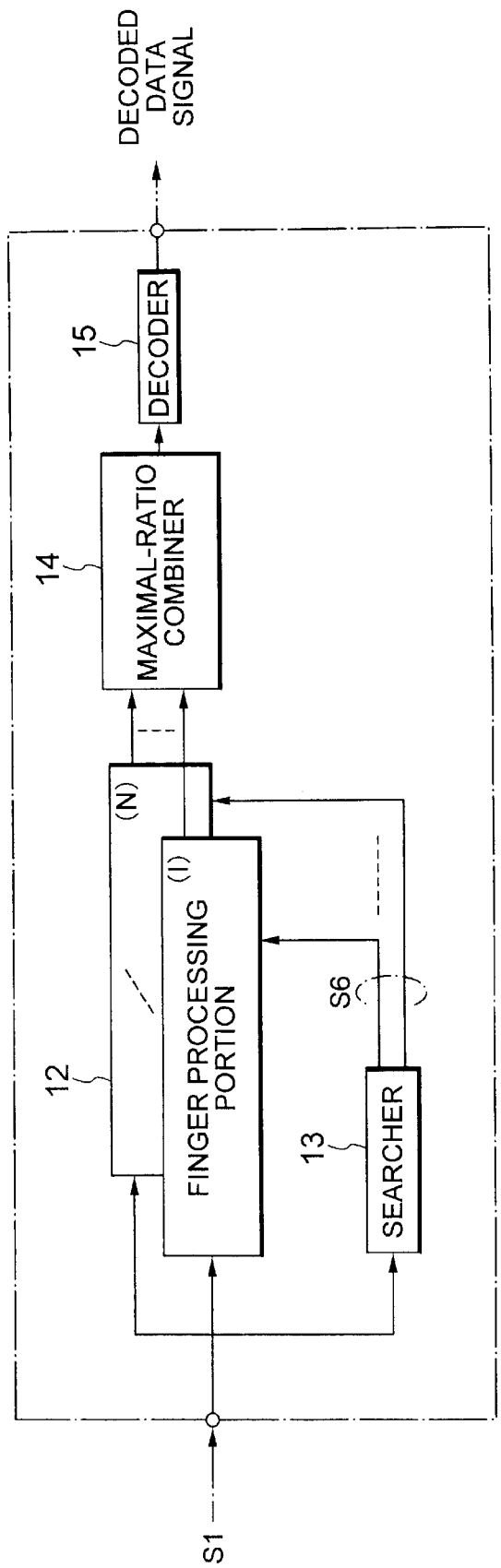
FIG. 1 shows a block diagram for use in describing a CDMA receiver according to this invention.

Referring to FIG. 1, it is assumed that a receiver according to this invention is used in each base station of a CDMA system and is operable in accordance with a diversity rake technique, as will become clear later. In this connection, the illustrated receiver may be called a CDMA receiver or a base station receiver. Although not shown in FIG. 1, the base station has a high frequency amplifier portion for high frequency amplification and frequency conversion and an intermediate frequency (IF) amplifier portion for intermediate frequency amplification. At any rate, the illustrated CDMA receiver is supplied with reception data signals S1 through the high frequency amplifier portion and the intermediate frequency (IF) amplifier portion in the form of baseband signals.

In the example illustrated, the CDMA receiver has first through N-th finger processing portions 12(1) to (N) where N is a positive integer, and a searcher 13. The first through the N-th finger processing portions 12(1) to 12(N) may be collectively called a rake receiver.

The searcher 13 receives the reception data signals S1 and searches reception timing which is optimum for the first through the N-th finger processing portions 12(1) to (N). As a result, the searcher 13 supplies the first through the N-th finger processing portions 12(1) to 12(N) with the reception timing as detected reception timing signals S6, as shown in FIG. 1. To this end, the illustrated searcher 13 calculates correlation values by successively shifting despreading timing of the reception data signals in a manner to be described later to search the optimum reception timing in each of the finger processing portions and to consequently detect chip synchronization.

Each of the first through the N-th finger processing portions 12(1) to 12(N) processes despreading operation of the reception data signals S1 in response to the detected reception timing signals S6 and produces processed signals obtained by despreading the reception data signals. The processed signals may be referred to as detected data signals detected from the reception data signals.

The processed signals which are despread by the first through the N-th finger processing portions 12(1) to 12(N) are sent to a maximal-ratio combiner 14 for summing up the processed signals by the use of the maximal-ratio combining technique. In other words, the maximal-ratio combiner 14 carries out rake combining related to the processed signals sent from the first through the N-th finger processing portions 12(1) to (N) and produces a rake combined signal which may be simply called a combined data signal also. The rake combined signal is delivered to a decoder 15 to be decoded into a decoded data signal.

Figure 2:
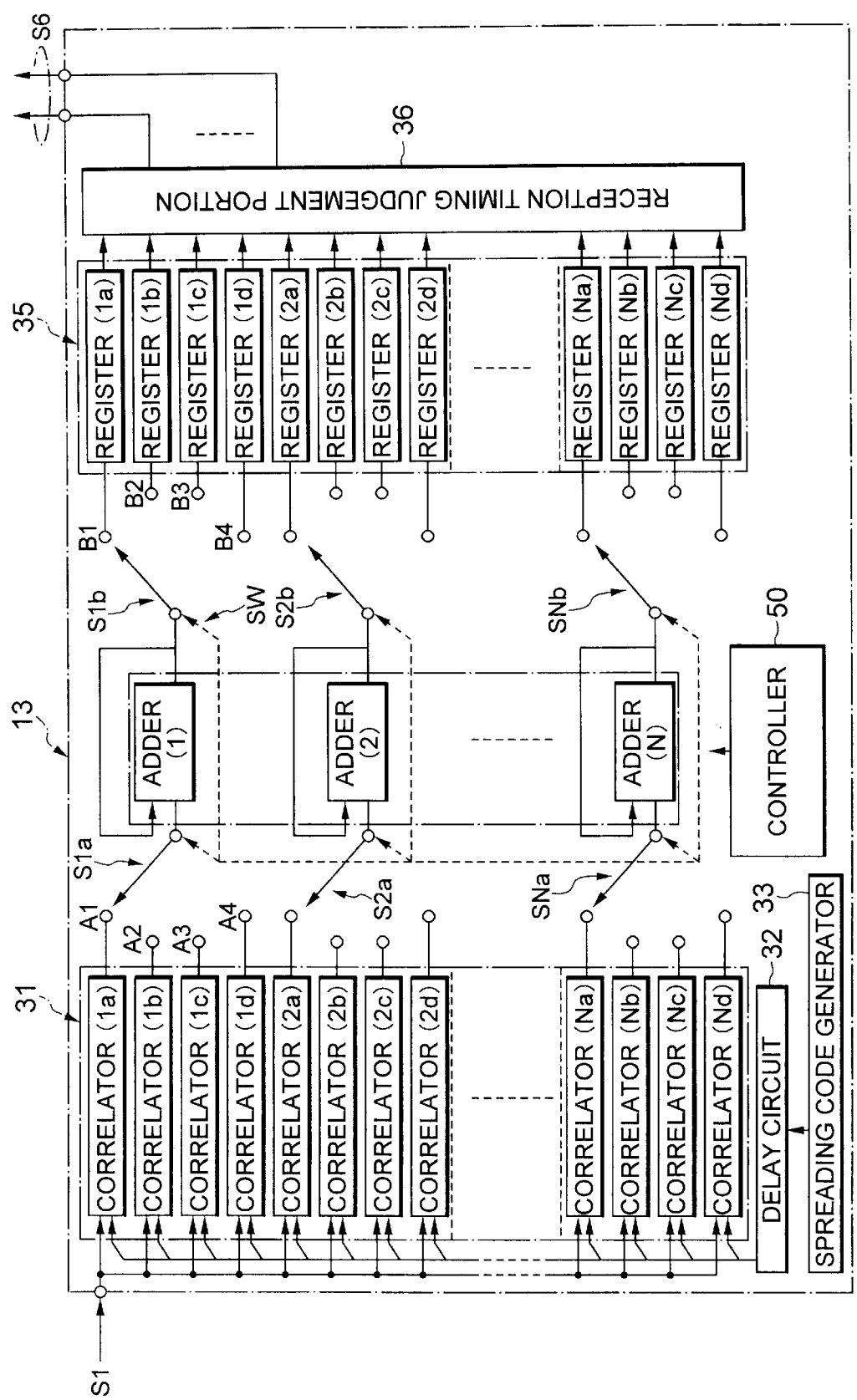
FIG. 2 shows a block diagram of a searcher according to a first embodiment of this invention.

Referring to FIG. 2, a searcher according to a first embodiment of this invention is applicable to the CDMA receiver of the base station illustrated in FIG. 1 and comprises a correlation calculator (may be called a correlation portion also) 31, a delay circuit 32, a spreading code generator 33 for generating a spreading code which is used to despread the reception data signals S1, and an adder portion 34. In the illustrated example, the searcher 13 further comprises a plurality of registers 35 and a reception timing judgment portion 36 both of which may be collectively called a timing decision circuit for determining optimum reception timing.

The illustrated correlation calculator 31 further comprises a plurality of internal correlators 1a to 1d, 2a to 2d . . . , Na to Nd which are grouped into first through N-th groups each of which has four internal correlators, as shown in FIG. 2.

With this structure, the spreading code is delivered from the spreading code generator 33 to the delay circuit 32 to be successively delayed by the delay circuit 32 and to be thereafter delivered to the internal correlators 1a–1d, . . . Na–Nd in a manner to be described later in detail.

The illustrated adder portion 34 has first through N-th adders (1) to (N) which correspond to the first through the N-th groups, respectively, and which are selectively connected to the four internal correlators of each group by first through N-th input side switches S1a to SNa, respectively. Each of the first through the N-th input side switches S1a to SNa has four movable contacts represented by A1 to A4 in connection with the first input side switch S1a. As a result, each of the four correlators 1a to 1d; 2a to 2d; . . . Na to Nd is selectively connected to each of the first through the N-th adders (1) to (N).

Figure 3:
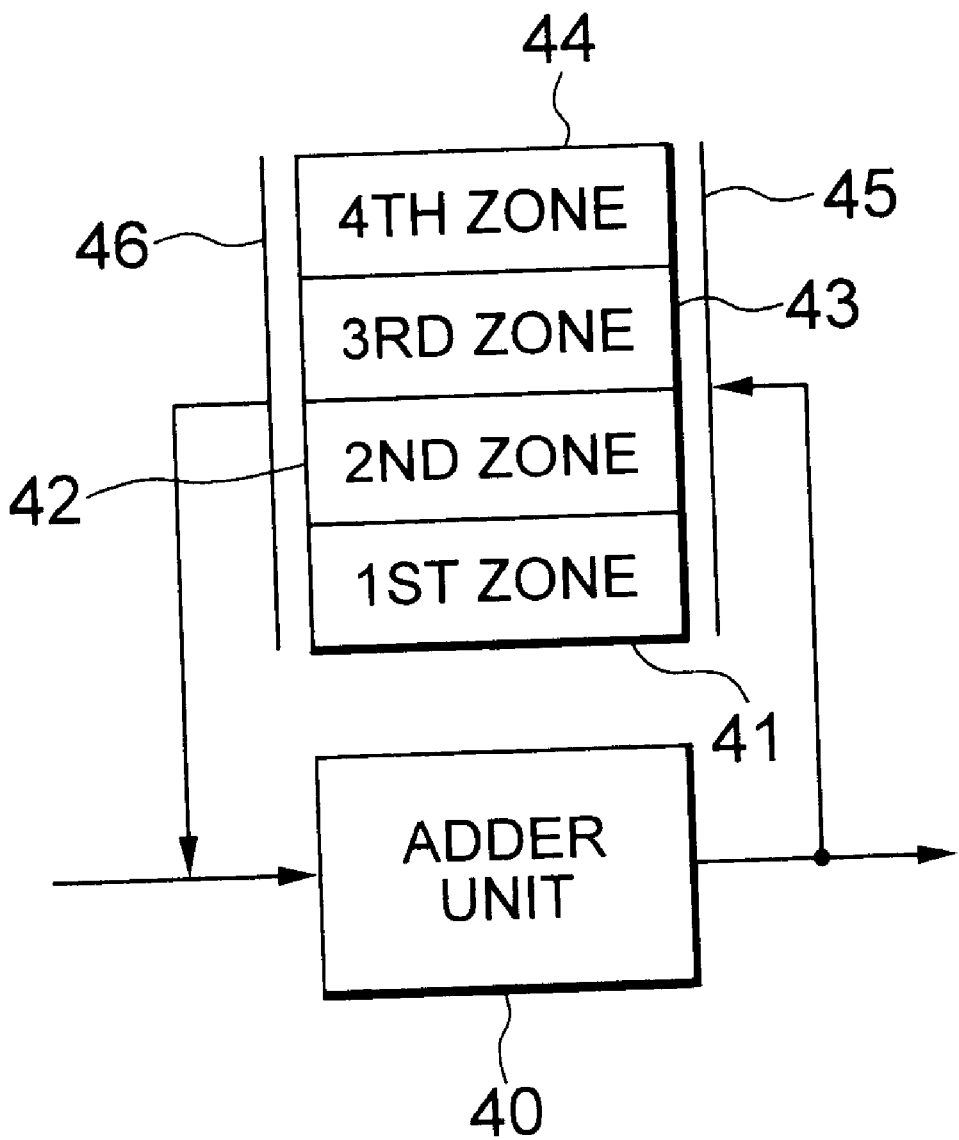
FIG. 3 shows a block diagram of an adder which is used in the searcher illustrated in FIG. 2.

Temporarily referring to FIG. 3 together with FIG. 2, each of the first through the N-th adders (1) to (N) has an adder unit 40 having an input side and an output side and first through fourth memory zones 41 to 44 between the output and the input sides of the adder unit 40 through selectors 45 and 46, although not shown in FIG. 1 for brevity of description. The first through the fourth memory zones 41 to 44 store sum results calculated by the adder unit 40 sent through the selector 45 and read the sum results through the selector 46 to send the same to the sum results again.

Referring back to FIG. 2, first through N-th output side switches S1b to SNB are connected to the first through the N-th adders (1) to (N), respectively. Each of the first through the N-th output side switches S1b to SNB has four movable contacts (specified by B1 to B4) connected to registers 1a to 1d; 2a to 2d; . . . Na to Nd which are operable to store the sum results as the processed correlation values. In any event, fixed contacts of the first through the N-th input side and output side switches S1a to Sna; S1b to SNb are connected to the input and the output sides of the first through the N-th adders (1) to (N).

As shown by broken lines in FIG. 2, the first input side switch S1a is switched in synchronism with the first output side switch S1b. Likewise, the second through the N-th input side switches S2a to SNa are also switched in synchronism with the second through the N-th output side switches S2b to SNb, respectively. In addition, it is to be noted that all of the first through the N-th input side switches S1a to SNa are switched simultaneously with all of the first through the N-th output side switches S1b to SNb. In order to switch the first through the N-th input side switches S1a to SNa and the first through the N-th output side switches S1b to SNb, the illustrated searcher 13 has a controller 50 for delivering control signals Co to the first through the N-th input and output side switches S1a to SNa and S1b to SNb.

Moreover, the correlators 1a to 1d; 2a to 2d; . . . Na to Nd of each group are in one-to-one correspondence to the registers 1a to 1d; 2a to 2d, . . . Na to Nd of each group, as readily understood from FIG. 2.

The registers (1a) to (Nd) are all connected to the reception timing judgment portion 36 to detect and produce the optimum reception timing signals.

In the illustrated example, the spreading code signal is delivered to each of the correlators 1a to 1d; 2a to 2d; . . . Na to Nd from the spread code generator 33 through the delay circuit 32. The delay circuit 32 is operable to successively delay the spreading code so as to be matched with the timing determined for each correlator 1a to Nd in a manner to be described later. Therefore, the delay circuit 32 is operable to produce successively delayed spreading codes.

With this structure, it is readily understood that each of the first through the N-th adders (1) to (N) is used in common to each group of the correlators 1a to 1d; 2a to 2d; . . . Na to Nd in a time division fashion and, as a result, the illustrated searcher is simple in structure.

Now, operation will be described in conjunction with the searcher illustrated in FIG. 2 more in detail. Herein, it is assumed that the reception data signals S are given to the illustrated searcher 13 at a predetermined chip rate and that each of the first through the N-th input and output side switches S1a to SNb is operated by a clock signal which has a clock rate equal to four times the predetermined chip rate. In consequence, the four movable contacts of each switch are successively switched or selected by each fixed contact from one to another at the clock rate equal to four times the predetermined chip rate.

In the illustrated example, the searcher 13 carries out despread operation of the reception data signals S1 by using the spreading code generated by the spread code generator 33 and delayed by the delay circuit 32. More specifically, the reception data signals S1 are despread by the spreading code which is delayed from the spread code generator 33 by the delay circuit 32 to be matched with correlation timing. On the other hand, each input sides of the first through the N-th adders (1) to (N) is connected to one of the four correlators, for example, (1a), (2a), . . . (Na) of each group while each output side of the first through the N-th adders (1) to (N) is connected to each of the corresponding registers, for example, (1a), (2a), . . . (Na), respectively.

Under the circumstances, the correlators (1a), (2a), . . . (Na) despread the reception data signals by the delayed spreading code to calculate the correlation values at the timing indicated by the delayed spreading code. The calculated correlation values are sent to the first through the N-th adders (1) to (N) to be added to previous correlation values and to be stored in the first memory zone 41 (FIG. 3).

In FIG. 4, such calculation of the correlation values is assumed to be executed within a first time slot equal to one-fourth of the chip period.

At a second time slot following the first time slot, it is assumed that the correlators (1b), (2b), . . . (Nb) are selected by the first through the N-th input side switches S1a to SNa while the registers (1b), (2b), . . . (Nb) are selected by the first through the N-th output side switches S1b to SNb. On the other hand, the spreading code is delayed by the delay circuit 32 by a delay time matched with the correlators (1b), (2b), . . . (Nb). The correlators (1b), (2b), . . . (Nb) calculate correlation values at the despread timing indicated by the delayed spreading code and supply them to the first through the N-th adders (1) to (N). The correlation values are added to prior correlation values by the adders (1) to (N) and stored in the second memory zones 42 of the adders (1) to (N).

Similar operation is repeated in connection with third and fourth time slots as shown in FIG. 4 to calculate correlation values at each despread timing and to finally store the registers (1c) to (Nc) or (1d) to (Nd).

Herein, let the searcher 13 have a minimum detectable timing interval and a searching range represented by dmin and Swin, respectively. In this event, the number of the correlators 1a to Nd may be equal to Swin/dmin.

Thus, the correlation values are sent through the first through the N-th input side switches S1a to SNa to the first through the N-th adders (1) to (N). Each of the first through the N-th adders (1) to (N) adds each correlation value to each previous value in the time division fashion to calculate a summed result. The summed result is sent to each register in the above-mentioned manner.

When the number of the correlators switched by each of the input side and the output side switches is equal to m, the number of the adders (1) to (N) is represented by Swin/dmin/m and is therefore equal to one-m th of the number of the correlators (1a) to (Nd).

In the example illustrated with reference to FIGS. 2 through 4, the number of m is equal to four, as readily understood from the above. However, the number of m may be varied within an operable range of the switches and the correlators.

As shown in FIG. 4, a single one of the adders (1) to (N) is arranged for four correlators (1a) to (1d); (2a) to (2d); ... (Na) to (Nd) to be selectively connected to the four correlators of each group. In this connection, the correlation values are sent to the first through the N-th adders (1) to (N) from every four correlators at each operation timing 1, 2, 3, and 4. Likewise, the number of the registers (1a) to (Nd) is equal to that of the correlators (1a) to (Nd) and specified by Swin/dmin. Therefore, register output signals are also produced at every four registers at each operation timing 1, 2, 3, and 4 in the illustrated example.

In other words, the correlation values, n in number, are added to obtain the summed values, n in number, by the first through the N-th adders (1) to (N) at every operation timing 1, 2, and 4 and the summed values, n in number, are stored in the registers, n in number.

The first through the N-th input side switches S1a to SNa and the first through the N-th output side switches S1b to SNb are switched in the time division fashion in response to the control signals Co produced by the controller 50, as mentioned before. Under the circumstances, all of the first through the N-th input side switches S1a to SNa and the first through the N-th output side switches S1b to SNb are synchronously switched to select either one of the correlators and the registers in each group. The illustrated control signals Co can be produced by the controller 50 by counting a sequence of clock signals having a frequency equal to four times the chip rate. In any rate, the control signals Co serve to select the movable contacts of each switch S1a to SNb in accordance with the count values of the clock signals.

Each of the first through the N-th adders (1) to (N) of the adder portion 34 repeats additions predetermined times (within an integration period determined in the searcher 13) to obtain summed correlation values. The summed correlation values are stored in the corresponding registers 1a to Nd of the register portion 35 and sent to the reception timing judgment portion 36. The reception timing judgment portion 36 decides effective paths from the stored correlation values and delivers the detected reception timing signals S6 to the first through the N-th finger processing portions 12(1) to (N) (FIG. 1). In other words, the reception timing judgment portion 36 serves to indicate the reception timing of each finger processing portion 12(1) to (N).

Figure 5:
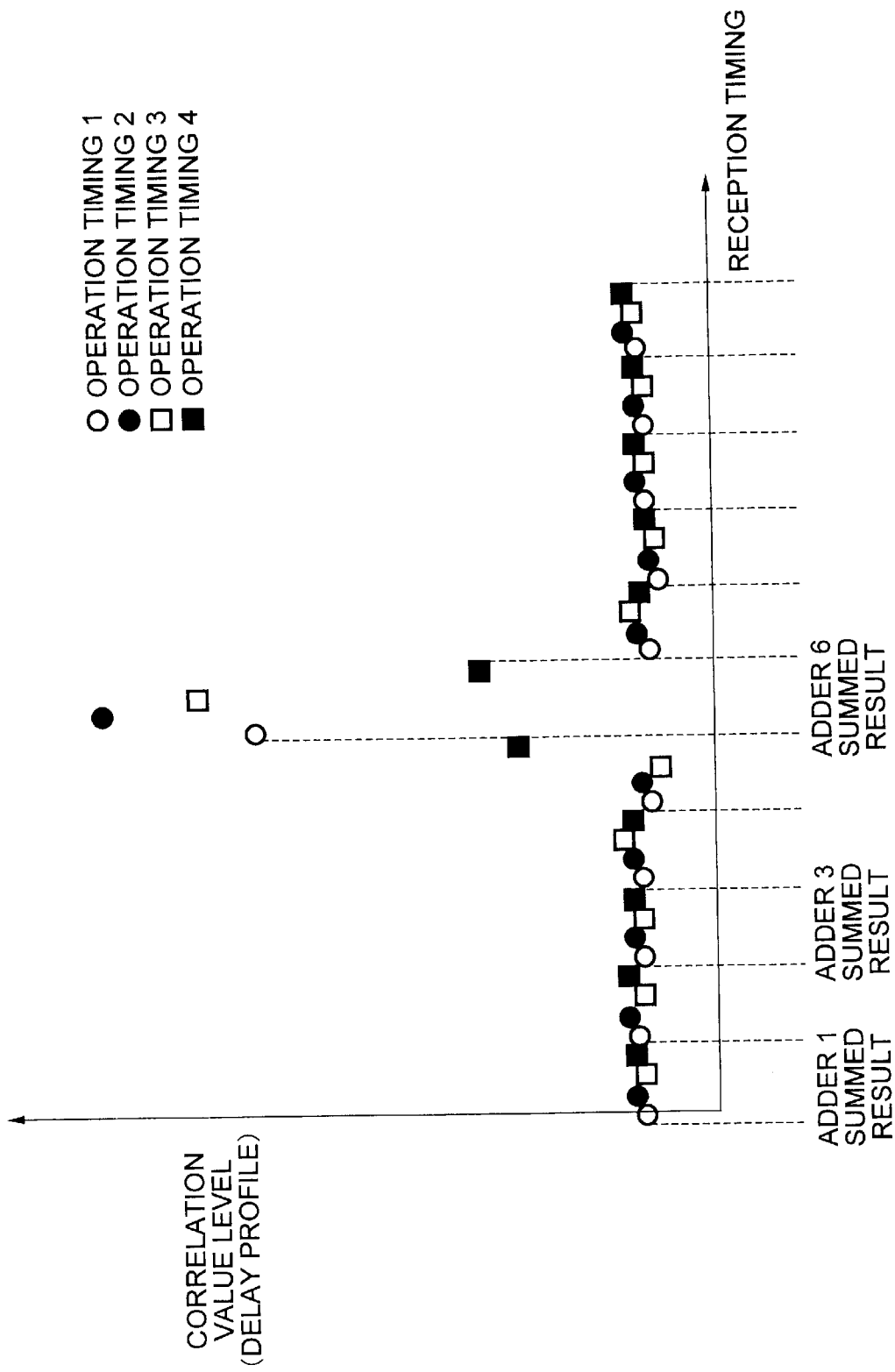
FIG. 5 shows a graphical representation for use in describing a relationship between reception timing and correlation value levels.

Referring to FIGS. 4 and 5, description will be made about the searcher 13 illustrated in FIGS. 2 and 3 on the assumption that each group of the correlators and the registers is composed of four and that the number of m (which may be called a multiple number) is equal to four. In the illustrated example, it is surmised that each of the correlation portion 31 and the adder portion 34 is operated at every slot 1, 2, 3, and 4 (FIG. 4) having a time interval of, for example, 0.625–1.25 ms. Specifically, the correlation values, n in number, are calculated within each slot by the correlators, n in number, selected by the first through the N-th input side switches S1a to SNa from the correlators 1a to Nd and are added by the first through the N-th adders (1) to (N) to obtain the summed results within each slot. The summed results are stored in the registers, n in number, of the register portion 35 through the first through the N-th output side switches S1b to SNb. In the illustrated example, the four correlators (a) to (d) in each group are successively selected by each input side switch within each slot in the order from the slot 1 to the slot 4. In other words, the four correlators (a) to (d) in each group are operated at first through fourth operation timing within the slots 1, 2, 3, and 4, respectively, as shown in FIG. 4, to calculate the correlation values within the slots 1, 2, 3, and 4 in the time division fashion. The correlation values calculated within the slots 1, 2, 3, and 4 are successively sent to the corresponding adder to obtain the summed results within the slots 1, 2, 3, and 4 and to store them in the corresponding registers in the time division fashion.

As illustrated in FIG. 4, each of the slots 1, 2, 3, and 4 defines the operation timing for despreading and continuously appears in sequence. In other words, each slot 1, 2, 3, and 4 lasts for the minimum time interval dmin for despreading operation.

Thus, each of the first through the N-th adders (1) to (N) successively adds each of the correlation values calculated by each of the correlators within each of the slots 1, 2, 3, and 4 and sends the summed result to the corresponding register. From this fact, it is understood that the correlation values over the searching range of the searcher 13 are calculated within four slots and such calculations are repeated at every fourth slot. This shows that additions of the correlation values concerned with the whole of the correlators are completed by the first through the N-th adders (1) to (N) within the four slots. Similar operation is executed during the integration period determined for the searcher 13 and the additions of the correlation values are repeated during the integration period which may be depicted by M.

In FIG. 5, illustration is made about reception timing taken along the abscissa and correlation value levels taken along the ordinate. The correlation value levels are obtained by repeatedly adding the correlation values the predetermined times within the integration period and are representative of a delay profile. The illustrated correlation value levels are specified by output signals of the registers selected by the first through the N-th output side switches S1b to SNb and are summed up at every operation timing or slot 1, 2, 3, and 4. In FIG. 5, the correlation value levels at the slots 1, 2, 3, and 4 are illustrated by white circles, black circles, white squares, and black squares, respectively. In the illustrated example, the sixth adder (not shown) takes a maximum correlation value level.

Turning back to FIG. 2, the illustrated correlation value levels are sent to the reception timing judgment portion 36 to be processed. The illustrated reception timing judgment portion 36 is operated at a processing period of N×m×M, where N is representative of the number of the adders; m, the multiple number; and M, the integration period. This shows that the reception timing judgment portion 36 executes the processing by the use of all of the integrated correlation value levels stored in the registers 1a to Nd to determine the detected reception timing of the effective path.

The detected reception timing is supplied from the reception timing judgment portion 36 to the first through the N-th finger processing portions 12(1) to (N) as the detected reception timing signals S6.

Supplied with the detected reception timing signals S6, the first through the N-th finger processing portions 12(1) to (N) carry out despreading operation and channel estimation on the basis of the detected reception timing signals S6 to produce detected data signals. The detected data signals are sent from the first through the N-th finger processing portions 12(1) to (N) to the maximal-ratio combiner 14. The illustrated maximal-ratio combiner 14 sums up the detected data signals to execute the maximal-ratio combining, namely, the rake combining to obtain combined data signals. The decoder 15 decodes the combined data signals into the decoded data signal.

Although the above-description has been mainly made on the assumption that the multiple number m is equal to four, each slot may be further divided into a plurality of time intervals when the illustrated searcher 13 is structured by hardware and software operated at a high speed. Accordingly, each correlator in the correlation portion 31 and each adder in the adder portion 34 may not be always operated at every slot.

Figure 6:
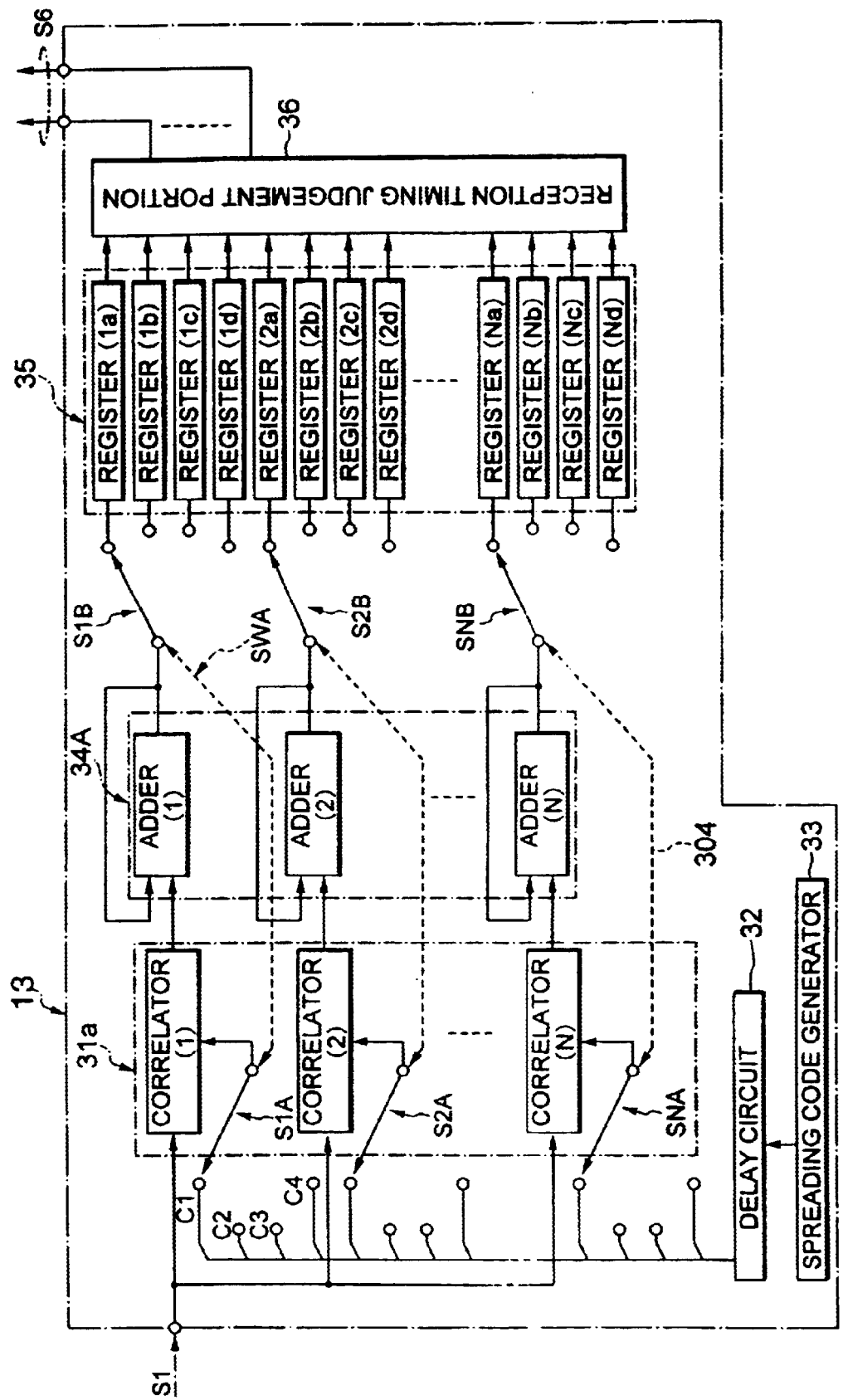
FIG. 6 shows a block diagram of a searcher according to a second embodiment of this invention.

Referring to FIG. 6, a searcher according to a second embodiment of this invention is also used in a base station and is similar in structure to that illustrated in FIG. 2 except that a correlation portion 31A has first through N-th correlators (1) to (N) operated in a time division fashion. Specifically, the first through the N-th correlators (1) to (N) are supplied with the reception data signals S1 and the delayed spreading codes which are delayed by the delay circuit 32. To this end, the first through the N-th input side switches S1a to SNa are located between the delay circuit 32 and the first through the N-th correlators 31A (1) to (N). In the illustrated example, each of the first through the N-th input side switches S1A to SNA has a fixed contact and four movable contacts, such as c1, c2, c3, c4, selectively connected to the fixed contact.

With this structure, each of the first through the N-th correlators 31A(1) to (N) calculates the correlation values between the reception data signals S1 and the delayed spreading codes in the time division fashion by executing the despreading operation at different timing. Therefore, it is possible to reduce the number of the correlators included in the correlation portion 31A.

The illustrated first through N-th input side switches S1A to SNA are also switched in synchronism with the first through the N-th output side switches S1B to SNB, like in FIG. 2, and all of the switches S1A to SNB are also synchronously operated, as mentioned before. In this connection, the switches S1A to SNB may be collectively represented by SWA in FIG. 6. In addition, the illustrated adder portion 34A has the first through the N-th adders (1) to (N) which may be identical with those illustrated with reference to FIGS. 2 and 3.

As a result, it is readily understood that both the correlation portion 31A and the adder portion 34A are operated in the time division fashion along with the register portion 35 in the searcher 13 illustrated in FIG. 6.

The first through the N-th correlators (1) to (N) of the correlation portion 31A are connected to the first through the N-th adders (1) to (N) of the adder portion 34A, respectively. In the illustrated example, it is assumed that each of the first through the N-th correlators (1) to (N) has a minimum reception time interval dmin detected by the searcher 13 and the searcher 13 has a searching range Swin searchable by the searcher 13. In addition, each of the correlators (1) to (N) is used in the time division fashion by switching the movable contacts of each switch S1A to SNA which are equal to the multiple number m, like in the switches S1B to SNB. In this event, the number of the correlators (1) to (N) is given by Swin/dmin/m and is equal to the number of the adders (1) to (N) in the adder portion 34A.

Next, operation will be described in connection with the searcher illustrated in FIG. 6 and is similar in principle to that illustrated in FIG. 2. However, it is to be noted in FIG. 6 that the correlators (1) to (N) in the correlation portion 31A are operated in the time division fashion by selecting the spreading codes delayed by the delay circuit 32 by using the first through the N-th input side switches S1A to SNA. As a result, the spreading codes are successively delayed by the minimum detectable time interval and given to the correlators (1) to (N).

Inasmuch as the reception data signals are delivered to the correlators (1) to (N), the reception data signals are despread in the correlators (1) to (N) by the delayed spreading codes which have different phases by dmin and which therefore provide different despreading timing.

Specifically, the delay circuit 32 produces the spreading codes which are equal in number to Swin/dmin and which have phases different from one another and successively delayed by dmin. When the multiple number m is equal to four, a first one of the spreading codes is selected at the operation timing 1 (FIG. 4) to be sent through the movable contact c1 to the correlator (1) while a second one of the spreading codes delayed by dmin relative to the first spreading code is selected at the operation timing 2 to be sent through the movable contact c2 to the correlator (1). Likewise, each of third and fourth ones of the spreading codes successively delayed by dmin relative to the first spreading code is successively selected at each operation timing to be sent through the movable contacts c3 and c4 to the correlator (1). Similar operation is carried out in connection with each of the remaining correlators (2) to (N). At any rate, each of the correlators (1) to (N) successively supplies the correlation values to the corresponding adder (1) to (N). Each adder (1) to (N) sums up the correlation values during the integration period M in connection with each spreading code delayed and supplies an integrated summed result signal to the corresponding register selected by each output side switch S1B to SNB.

When m=4, the integrated result signals are sent from each adder to the registers (1a), (2a), ... (Na) at the operation timing 1 while they are sent from each adder to the registers (1b), (2b), ... (Nb) at the operation timing 2. Likewise, the integrated result signals are sent from each adder to the registers (1c), (2c), ... (Nc) and (1d), (2d), ... (Nd) at the operation timing 3 and 4.

As mentioned before, all of the first through the N-th input side switches S1A to SNA and the first through the N-th output side switches S1B to SNB are operated in synchronism with one another. From this fact, it is understood that the registers (a), (b), (c), and (d) are loaded with the integrated result signals at the operation timing 1, 2, 3, and 4 when the delayed spreading codes are selected at the movable contacts c1, c2, c3, and c4, respectively.

The integrated result signals which are representative of the integrated correlation value levels during the integration period M can be shown as a delay profile in the manner illustrated in FIG. 5.

The reception timing judgment portion 36 judges the correlation value level and optimum reception timing as the detected reception timing by using the integrated result signals sent from the registers. The detected reception timing is delivered to the first through the N-th finger processing portions 12(1) to (N) as the detected reception timing signals S6.

Each of the first through the N-th finger processing portions 12(1) to (N) estimates a desired channel by the use of the detected reception timing signals S6 and produces a detected signal. The detected signals in the first through the N-th finger processing portions 12(1) to (N) are added to one another by the maximal-ratio combiner 14 to carry out the maximal-ratio combining or the rake combining and to produce a combined data signal. The combined data signal is decoded by the decoder 15 (FIG. 1) into the decoded data signal.

As mentioned before, the receiver according to this invention comprises a plurality of adders and/or correlators which are operated in the time division fashion. Moreover, a plurality of the registers are also operated in the time division fashion. For this purpose, the input and the output side switches are arranged before and after the adders.

While this invention has thus far been described in conjunction with a few embodiments thereof, it will readily be possible for those skilled in the art to put this invention into practice in various other manners. For example, this invention may be applicable to a receiver which is used in a mobile terminal instead of the base station. In addition, this invention may not be restricted to the maximal-ratio combining.

At any rate, the receiver according to this invention becomes small in size even when the searching range is widened as each cell or service area becomes wide. This is because the numbers of the correlators and/or the adders can be reduced to one m-th, where m represents the multiple number. This means that this invention is very effective for the CDMA receiver which executes the diversity rake combining.

What is claimed is:

1. A searcher for use in a CDMA receiver to search optimum reception timing from reception data signals which are received through a plurality of paths, comprising:

calculation means for calculating, in a time division fashion, correlation values between the reception data signals and successively delayed spreading codes, to produce summed up correlation values, wherein the calculation means comprises: despreading means for despreading the reception data signals by using the successively delayed spreading codes to produce the correlation values;

decision means for determining the optimum reception timing from the summed up correlation values;

summing means for summing up each of the correlation values in the time division fashion to obtain the summed up correlation values in the time division fashion, and further wherein the despreading means comprises:
a spread code generator for generating a spreading code;
a delay circuit for successively delaying the spreading code to produce the successively delayed spreading codes;
a plurality of correlators for carrying out correlation calculations between the reception signals and the successively delayed spread codes to produce correlation values;
the summing means comprising a plurality of adders for successively summing up the correlation signals to produce summed up correlation signals;
a timing decision circuit for judging the reception timing from the summed up correlation signals to decide the optimum reception timing; and
a plurality of switches between the correlators and the adders and between the adders and the timing judgement circuit, for selectively supplying the correlation values from selected ones of the correlators to the adders in the time division fashion and for supplying the summed up correlation values to the timing judgment circuit in the time division fashion.

2. A searcher for use in a CDMA receiver to search optimum reception timing from reception data signals which are received through a plurality of paths, comprising:

calculation means for calculating, in a time division fashion, correlation values between the reception data signals and successively delayed spreading codes, to produce summed up correlation values, the calculation means comprising:

despreading means for despreading the reception data signals in the time division fashion by using the successively delayed spreading codes to produce the correlation values in the time division fashion, summing means for summing up each of the correlation values to obtain the summed up correlation values in the time division fashion, and decision means for determining the optimum reception timing from the summed up correlation values;

wherein the despreading means further comprises:
a spread code generator for generating a spreading code;
a delay circuit for successively delaying the spreading code to produce the successively delayed spreading codes;
a plurality of correlators for carrying out correlation calculations between the reception signals and the successively delayed spread codes to produce the correlation values; and
a plurality of switches between the delay circuit and the correlators for selectively supplying the successively delayed spreading codes to make the correlators produce the correlation values in the time division fashion.

3. A searcher for use in a code division multiple access (CDMA) receiver for searching for optimum reception timing from received data signals, comprising:

calculation means for calculating correlation values between the received data signals and successively delayed spreading codes, said correlation values selectively supplied to an adder via a switch, said adder producing summed correlation values, wherein the calculation means further comprises:

despreading means for despreading the received data signals by using the successively delayed spreading codes to produce the correlation values, summing means for summing each of the correlation values to obtain the summed correlation values, and decision means for determining the optimum reception timing from the summed correlation values;

wherein the despreading means further comprises:
a spread code generator for generating a spreading code;
a delay circuit for successively delaying the spreading code to produce the successively delayed spreading codes;
a plurality of correlators for carrying out correlation calculations between the received data signals and the successively delayed spread codes to produce correlation values;
the summing means comprising a plurality of adders for successively summing the correlation signals to produce summed correlation signals;
a time decision circuit for judging for judging the reception timing from the summed correlation signals to decide the optimum reception timing; and
a plurality of switches between the correlators and the adders and between the adders and the timing judgement circuit, for selectively supplying the correlation values from selected ones of the correlators to the adders and for supplying the summed correlation values to the timing judgment circuit.

* * * * *